(12) United States Patent (10) Patent No.: US 8,783,573 B2
Havens et al. (45) Date of Patent: Jul. 22, 2014

(54) INDICIA READING TERMINAL HAVING PLURALITY OF OPTICAL ASSEMBLIES

(75) Inventors: William H. Havens, Syracuse, NY (US); Chen Feng, Snohomish, WA (US); Colleen P. Gannon, Jordan, NY (US); Jianhua Li, Fremont, CA (US); Ynjiun P. Wang, Cupertino, CA (US)

(73) Assignee: Hand Held Products, Inc., Fort Mill, SC (US)

( * ) Notice: Subject to any disclaimer, the term of this patent is extended or adjusted under 35 U.S.C. 154(b) by 112 days.

(21) Appl. No.: 12/326,443

(22) Filed: Dec. 2, 2008

(65) Prior Publication Data

US 2010/0133345 A1 Jun. 3, 2010

(51) Int. Cl.
*G02B 26/08* (2006.01)

(52) U.S. Cl.
USPC ............ 235/462.22; 235/462.01; 235/462.17; 235/472.01

(58) Field of Classification Search
USPC .................. 235/472, 462.17, 472.01, 462.35, 235/462.01, 462.22; 250/208.1, 216
See application file for complete search history.

(56) References Cited

U.S. PATENT DOCUMENTS

| | | | |
|---|---|---|---|
| 4,085,423 A | 4/1978 | Tsunoda et al. | |
| 4,542,528 A | 9/1985 | Sanner et al. | |
| 4,818,847 A | 4/1989 | Hara et al. | |
| 4,877,949 A | 10/1989 | Danielson et al. | |
| 4,920,255 A | 4/1990 | Gabeler | |
| 5,010,241 A | 4/1991 | Butterworth | |
| 5,227,614 A | 7/1993 | Danielson et al. | |
| 5,340,971 A | 8/1994 | Rockstein et al. | |
| 5,504,367 A | 4/1996 | Arackellian et al. | |
| 5,541,419 A | 7/1996 | Arackellian | |
| 5,579,487 A | 11/1996 | Meyerson et al. | |
| 5,591,955 A | 1/1997 | Laser | |
| 5,668,803 A | 9/1997 | Tymes et al. | |
| 5,672,858 A | 9/1997 | Li et al. | |
| 5,689,365 A | 11/1997 | Takahashi | |
| 5,703,349 A | 12/1997 | Meyerson et al. | |
| 5,714,745 A | 2/1998 | Ju et al. | |
| 5,717,195 A | 2/1998 | Feng et al. | |
| 5,717,221 A | 2/1998 | Li et al. | |
| 5,727,239 A | 3/1998 | Hankawa et al. | |
| 5,734,153 A | 3/1998 | Swartz et al. | |
| 5,736,726 A | 4/1998 | VanHorn et al. | |
| 5,739,518 A | 4/1998 | Wang | |
| 5,744,815 A | 4/1998 | Gurevich et al. | |
| 5,756,981 A | 5/1998 | Roustaei et al. | |
| 5,777,743 A | 7/1998 | Bacchi et al. | |
| 5,780,831 A | 7/1998 | Seo et al. | |
| 5,814,827 A | 9/1998 | Katz | |

(Continued)

OTHER PUBLICATIONS

U.S. Appl. No. 12/637,528, filed Dec. 14, 2009.

*Primary Examiner* — Michael G Lee
*Assistant Examiner* — Tabitha Chedekel
(74) *Attorney, Agent, or Firm* — Additon, Higgins, Pendleton & Ashe, P.A.

(57) ABSTRACT

There is described an indicia reading terminal having an image sensor array including a plurality of pixels, a first optical assembly for focusing imaging light rays onto a first set of pixels of an image sensor array and a second optical assembly for focusing imaging light rays onto a second set of pixels of the image sensor array. The indicia reading terminal can be adapted to process image data corresponding to pixels of the image sensor array for attempting to decode a decodable indicia.

28 Claims, 7 Drawing Sheets

(56) References Cited

U.S. PATENT DOCUMENTS

| | | |
|---|---|---|
| 5,815,811 A | 9/1998 | Pinard et al. |
| 5,818,528 A | 10/1998 | Roth et al. |
| 5,825,006 A | 10/1998 | Longacre, Jr. et al. |
| 5,825,532 A | 10/1998 | Mochizuki et al. |
| 5,835,133 A | 11/1998 | Moreton et al. |
| 5,859,970 A | 1/1999 | Pleso |
| 5,872,354 A | 2/1999 | Hanson |
| 5,920,061 A | 7/1999 | Feng |
| 5,936,218 A | 8/1999 | Ohkawa et al. |
| 5,949,052 A | 9/1999 | Longacre, Jr. et al. |
| 5,949,056 A | 9/1999 | White |
| 5,949,057 A | 9/1999 | Feng |
| 5,971,915 A | 10/1999 | Yamamoto et al. |
| 5,979,753 A | 11/1999 | Roslak |
| 5,979,757 A | 11/1999 | Tracy et al. |
| 5,988,506 A | 11/1999 | Schaham et al. |
| 5,992,744 A | 11/1999 | Smith et al. |
| 6,003,008 A | 12/1999 | Postrel et al. |
| 6,006,990 A | 12/1999 | Ye et al. |
| 6,049,813 A | 4/2000 | Danielson et al. |
| 6,053,408 A * | 4/2000 | Stoner ............... 235/462.22 |
| 6,062,475 A | 5/2000 | Feng |
| 6,062,477 A | 5/2000 | Wike, Jr. et al. |
| 6,084,528 A | 7/2000 | Beach et al. |
| 6,092,728 A | 7/2000 | Li et al. |
| 6,123,261 A | 9/2000 | Roustaei |
| 6,123,263 A | 9/2000 | Feng |
| 6,141,046 A | 10/2000 | Roth et al. |
| 6,155,491 A | 12/2000 | Dueker et al. |
| 6,179,208 B1 | 1/2001 | Feng |
| 6,223,988 B1 | 5/2001 | Batterman et al. |
| 6,247,645 B1 | 6/2001 | Harris et al. |
| 6,298,176 B2 | 10/2001 | Longacre, Jr. et al. |
| 6,313,917 B1 | 11/2001 | Tang et al. |
| 6,317,260 B1 | 11/2001 | Ito et al. |
| 6,318,635 B1 | 11/2001 | Stoner |
| 6,330,973 B1 | 12/2001 | Bridgelall et al. |
| 6,340,114 B1 * | 1/2002 | Correa et al. ............ 235/462.22 |
| 6,347,163 B2 | 2/2002 | Roustaei |
| 6,352,517 B1 | 3/2002 | Flock et al. |
| 6,398,112 B1 | 6/2002 | Li et al. |
| 6,431,452 B2 | 8/2002 | Feng |
| 6,547,139 B1 | 4/2003 | Havens et al. |
| 6,575,368 B1 | 6/2003 | Tamburrini et al. |
| 6,637,658 B2 | 10/2003 | Barber et al. |
| 6,655,595 B1 | 12/2003 | Longacre, Jr. et al. |
| 6,676,016 B1 | 1/2004 | Coskrey, IV |
| 6,681,994 B1 | 1/2004 | Koenck |
| 6,722,569 B2 | 4/2004 | Ehrhart et al. |
| 6,824,059 B2 | 11/2004 | Jam et al. |
| 6,832,725 B2 | 12/2004 | Gardiner et al. |
| 6,889,904 B2 | 5/2005 | Bianculli et al. |
| 7,014,113 B1 | 3/2006 | Powell et al. |
| 7,040,538 B2 * | 5/2006 | Patel et al. ................... 235/454 |
| 7,086,596 B2 | 8/2006 | Meier et al. |
| 7,219,843 B2 | 5/2007 | Havens et al. |
| 2001/0003071 A1 | 6/2001 | Mansutti et al. |
| 2001/0013549 A1 | 8/2001 | Harris et al. |
| 2001/0055422 A1 | 12/2001 | Roustaei |
| 2002/0039099 A1 | 4/2002 | Harper |
| 2003/0018897 A1 | 1/2003 | Bellis et al. |
| 2003/0132292 A1 | 7/2003 | Gomez et al. |
| 2003/0178492 A1 | 9/2003 | Tamburrini et al. |
| 2003/0222147 A1 | 12/2003 | Havens et al. |
| 2003/0226895 A1 | 12/2003 | Havens et al. |
| 2004/0020990 A1 | 2/2004 | Havens et al. |
| 2004/0031851 A1 | 2/2004 | Bianculli et al. |
| 2004/0035933 A1 | 2/2004 | Havens et al. |
| 2004/0129783 A1 | 7/2004 | Patel |
| 2005/0279836 A1 | 12/2005 | Havens et al. |
| 2006/0255144 A1 | 11/2006 | Meier et al. |
| 2006/0274171 A1 | 12/2006 | Wang |
| 2006/0283952 A1 | 12/2006 | Wang |
| 2008/0291531 A1 * | 11/2008 | Heimer ........................ 359/351 |

* cited by examiner

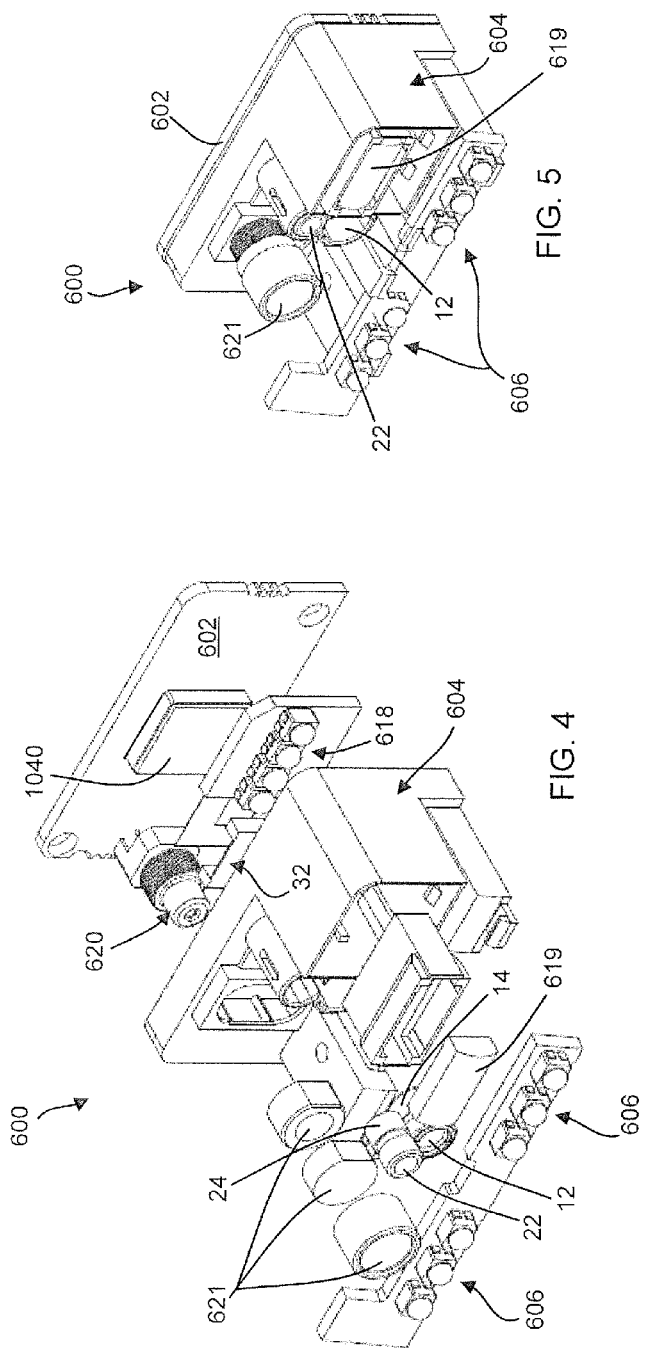
FIG. 4
FIG. 5
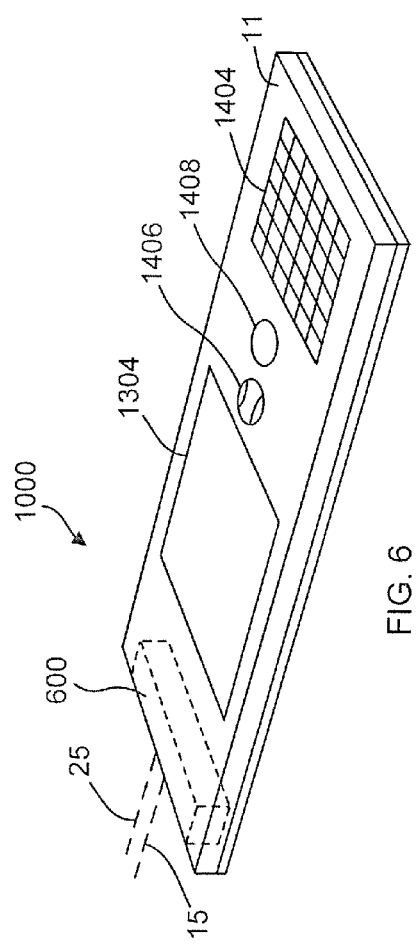
FIG. 6

US 8,783,573 B2

INDICIA READING TERMINAL HAVING PLURALITY OF OPTICAL ASSEMBLIES

FIELD OF THE INVENTION

The invention relates to registers in general and in particular to an optical based register.

BACKGROUND OF THE PRIOR ART

Indicia reading terminals are available in multiple varieties. The well known gun style reader as commonly seen at retail store checkout counters is typically available in a form devoid of a keyboard and display. Enhanced functioning indicia reading terminals having keyboards displays and advanced networking communication capabilities are also available.

Users of indicia reading terminals whatever the variety have long desired an increase in working range (a measure of a terminal's capacity to decode decodable indicia at a wide range of terminal to target distances). Various proposals have been made for increasing a terminal's working range. Approaches in the prior art have been based on optical design, analog signal processing, digital signal processing and on combinations of the above. However, designs for increased working range have often resulted in high cost, significantly increased complexity in manufacturability, reduced reliability and reduced durability.

There remains a need for an increased working range indicia reading terminal that is of low cost, is easy to manufacture, reliable and durable.

SUMMARY OF THE INVENTION

There is described an indicia reading terminal having an image sensor array including a plurality of pixels, a first optical assembly for focusing imaging light rays onto a first set of pixels of an image sensor array and a second optical assembly for focusing imaging light rays onto a second set of pixels of the image sensor array. The indicia reading terminal can be adapted to process image data corresponding to pixels of the image sensor array for attempting to decode a decodable indicia.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 4 is an exploded perspective view of an imaging module in one embodiment;

FIG. 5 is an assembled perspective view of an imaging module as shown in FIG. 4;

FIG. 6 is a perspective view of an indicia reading terminal in one embodiment including a hand held housing that encapsulates an imaging module;

DETAILED DESCRIPTION OF THE INVENTION

Figure 1:
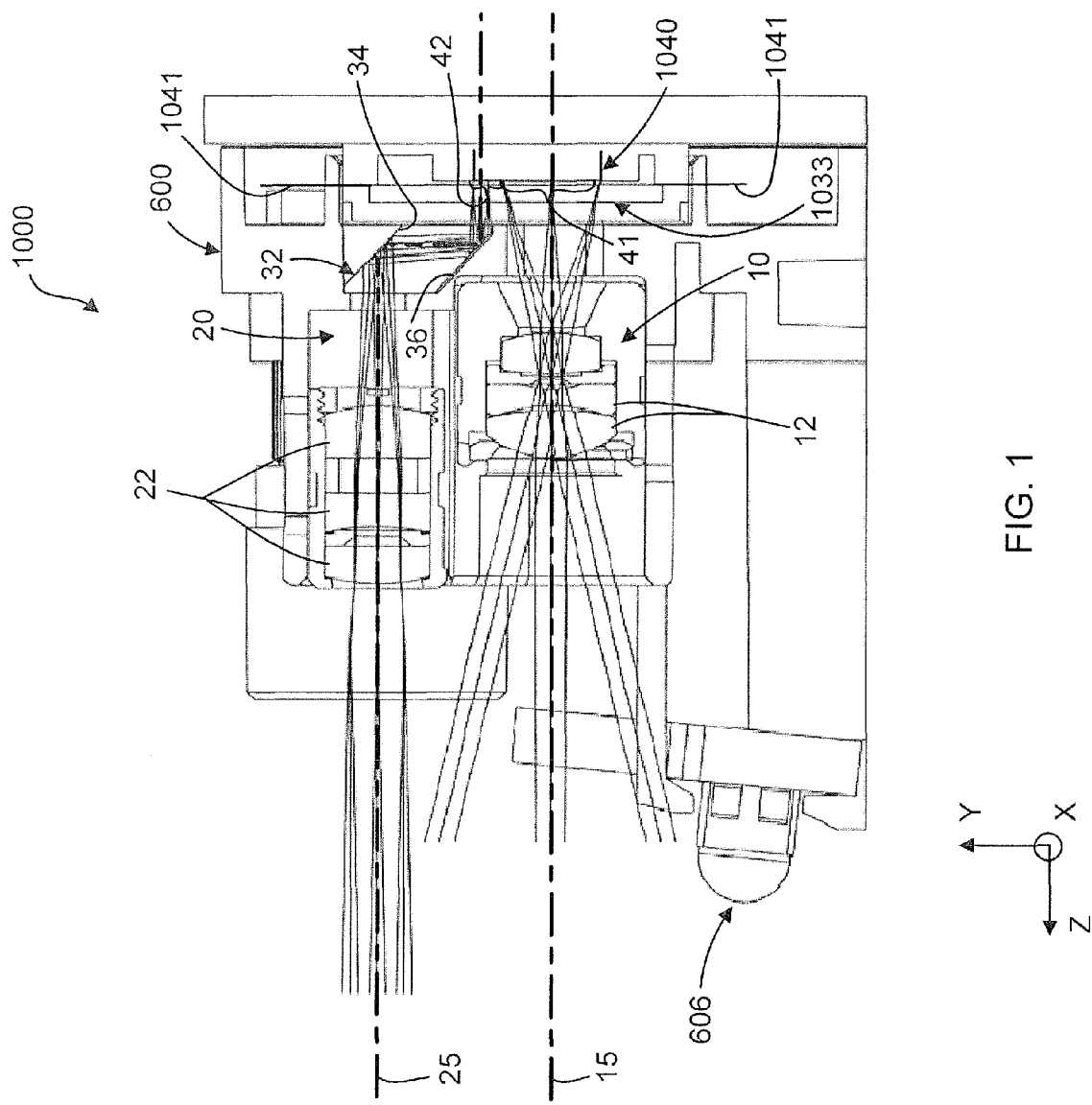
FIG. 1 is a side cross sectional view of an indicia reading terminal imaging module in an illustrative embodiment having a first optical assembly and a second optical assembly.

A cross sectional side view of an exemplary imaging module 600 of indicia reading terminal 1000 in one embodiment is shown in FIG. 1. Terminal 1000 can have a first optical assembly 10 and a second optical assembly 20. Terminal 1000 can also have an image sensor array 1033 including a plurality of pixels and can be configured so that first optical assembly 10 focuses imaging light rays onto a first set of pixels 41 of an image sensor array 1033 and a second optical assembly 20 focuses imaging light rays onto a second set of pixels 42 of the image sensor array 1033. Indicia reading terminal 1000 can be adapted to process image data corresponding to pixels of the image sensor array 1033 for attempting to decode a decodable indicia.

In the exemplary embodiment the first and second optical assemblies can have different characteristics. In one aspect the first and second optical assemblies can have different characteristics in terms of their folding of a center optical axis. In another aspect the first and second optical assemblies can have different focal lengths. In yet another aspect the first and second optical assemblies can have different best focus distances so that the first optical assembly 10 provides optimal focusing at a first terminal to target distance and the second optical assembly 20 provides optimal focusing at a second best focus distance.

A hardware platform suitable for supporting operational aspects of an indicia reading terminal described herein is described with reference to FIG. 2. Indicia reading terminal 1000 can include an image sensor 1032 comprising a multiple pixel image sensor array 1033 having pixels arranged in rows and columns of pixels, associated column circuitry 1034 and row circuitry 1035. Associated with the image sensor 1032 can be amplifier circuitry 1036, and an analog to digital converter 1037 which converts image information in the form of analog signals read out of image sensor array 1033 into image information in the form of digital signals. Image sensor 1032 can also have an associated timing and control circuit 1038 for use in controlling e.g., exposure periods of image sensor 1032, and gain applied to the amplifier circuitry 1036. The noted circuit components 1032, 1036, 1037, and 1038 can be packaged into a common image sensor integrated circuit 1040. In one example, image sensor integrated circuit 1040 can be provided by a CMOS image sensor integrated circuit. In another example, image sensor integrated circuit 1040 can incorporate a Bayer pattern filter. In such an embodiment, CPU 1060 prior to subjecting a frame to further processing can interpolate pixel values intermediate of green pixel values for development of a monochrome frame of image data. Image sensor integrated circuit 1040 can also include a filter element defining color sensitive pixel elements dispersed throughout an array of monochrome pixels.

Figure 3:
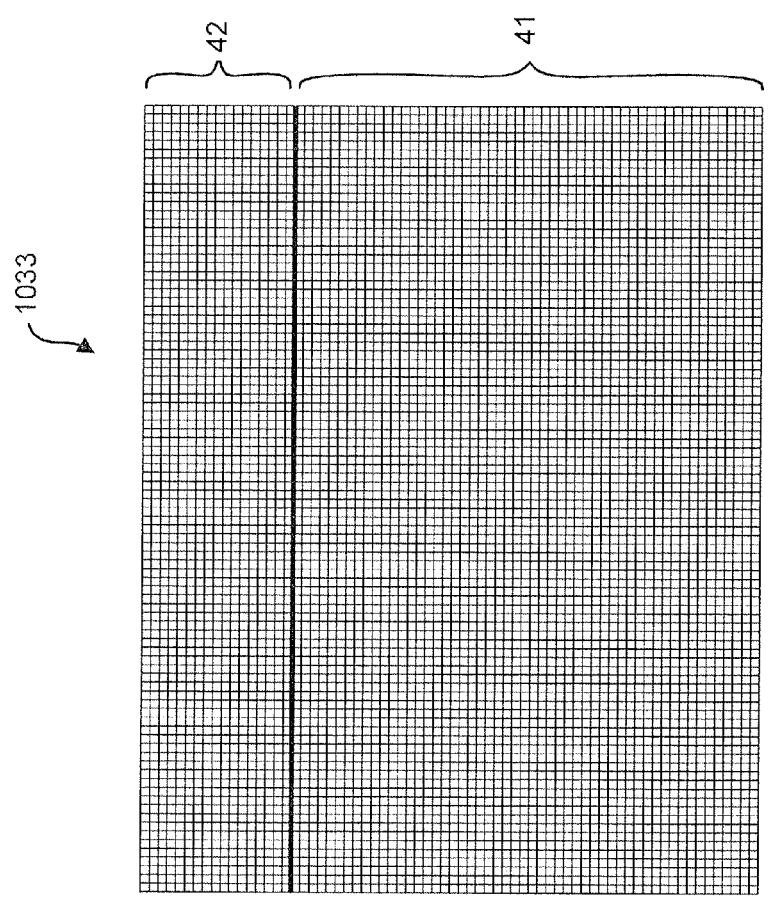
FIG. 3 is a top view of an image sensor array having a first set of pixels and a second set of pixels.

A top view of an image sensor array 1033 is shown in FIG. 3. Image sensor array 1033 can include first set of pixels 41 onto which light transmitted by first optical assembly 10 is incident and second set of pixels 42 onto which light transmitted by second optical assembly 20 is incident. First set of pixels 41 can comprise the pixels of more than 50% of the rows of pixels of array 1033, and second set of pixels 42 can comprise the pixels of less than 50% of the rows of pixels of array 1033. In another embodiment, first set of pixels 41 can comprise about 60% of the rows of pixels of array 1033, and second set of pixels 42 can comprise about 40% of the rows of pixels of array 1033. In another embodiment, first set of pixels 41 can comprise about 75% of the rows of pixels of array 1033, and second set of pixels 42 can comprise about 25% of the rows of pixels of array 1033 as is shown in FIG. 3. A particular embodiment of image sensor array 1033 that is divided into a first set of pixels 41 and a second set of pixels 42 is summarized herein below in Table 1.

TABLE 1

| | |
|---|---|
| Pixel Size: | 0.0058 mm square |
| Active array matrix: | 838 H by 640 V |

TABLE 1-continued

| | |
|---|---|
| Active array size: | 4.8604 mm × 3.712 mm |
| 1D array matrix: | 838 H by 160 V |
| 1D array size: | 4.8604 mm × 0.928 mm |
| 2D array matrix: | 838 H by 480 V |
| 2D array size: | 4.8604 mm × 2.784 mm |
| Separation 1D & 2D areas | 1.856 mm |

In the course of operation of terminal 1000 image signals can be read out of image sensor 1032, amplified by amplifier 1036, converted by analog to digital converter 1037 and stored into a system memory such as RAM 1080. A set of image data corresponding to pixels of image sensor array 1033 can be regarded as a frame of image data. A memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include CPU 1060 which can be adapted to address and read out image data stored in memory 1080 and subject such image data to various image processing algorithms. Terminal 1000 can include a direct memory access unit (DMA) 1070 for routing image information read out from image sensor 1032 that has been subject to amplification and conversion to RAM 1080. In another embodiment, terminal 1000 can employ a system bus 1500 providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Terminal 1000 can be operative so that terminal 1000 can capture a succession of frames by storage of the frames in memory 1080 where the frames are addressable for processing by CPU 1060. Terminal 1000 can be operative so that the capture and/or processing of the succession of frames is responsive to activation of a trigger signal. Terminal 1000 can be operative so that such trigger signal can be activated when an operator actuates a trigger of terminal 1000.

Figure 2:
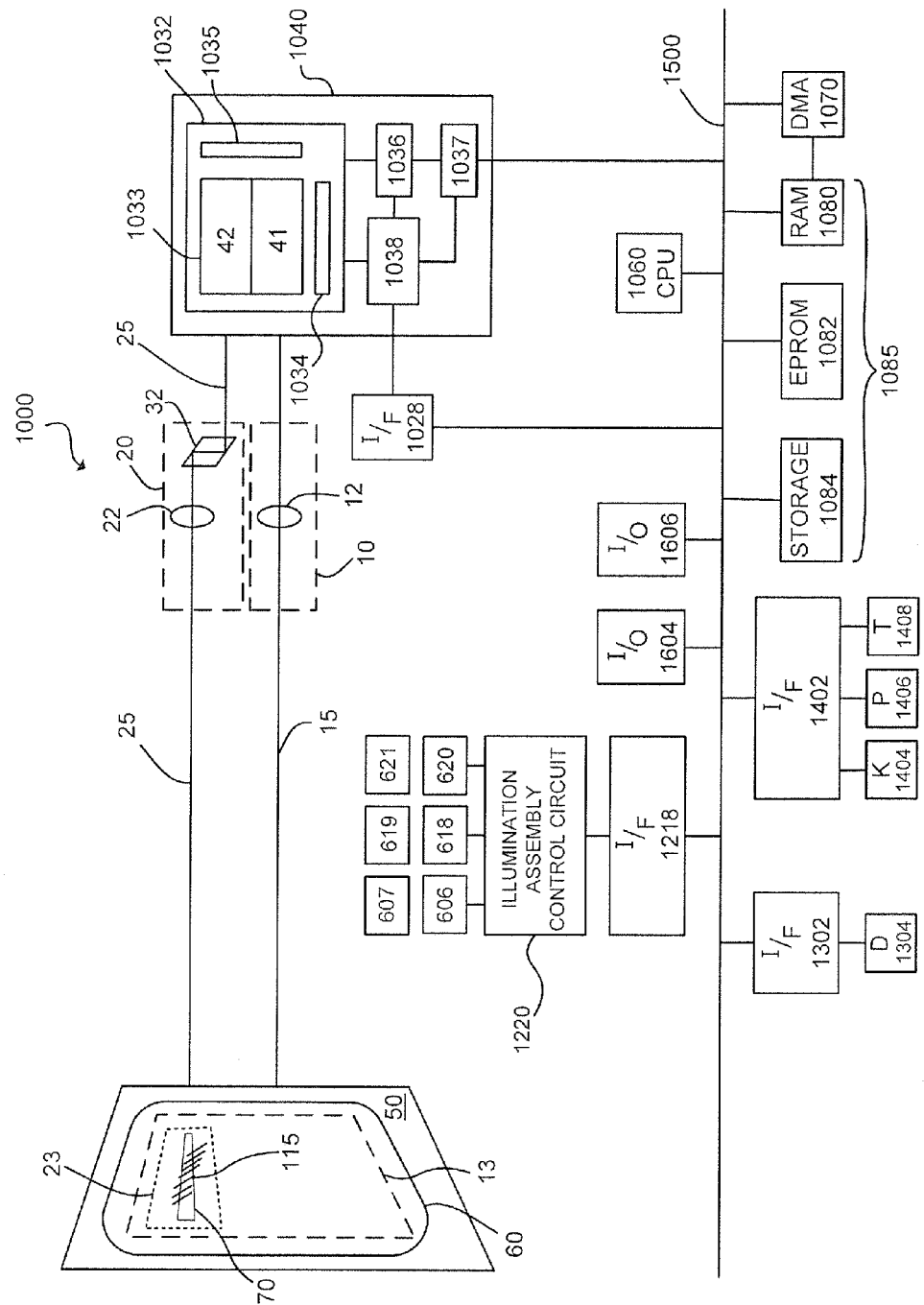
FIG. 2 is a block diagram illustrating exemplary hardware components which can be incorporated in an indicia reading terminal as described herein.

As illustrated in FIG. 2 and as described further herein, terminal 1000 can include a first optical assembly 10 and a second optical assembly 20. The first optical assembly 10 can have an imaging lens 12 and a center optical axis 15 and the second optical assembly 20 can include an imaging lens 22, center optical axis 25 and a prism 32 for folding the center optical axis 25 of the second optical assembly 20. First optical assembly 10 together with image sensor array 1033 can define an associated first field of view 13 on a target substrate 50 and second optical assembly 20 can define an associated second field of view 23 on a target substrate 50.

Terminal 1000 can also include an illumination pattern light source bank 606 for use in projecting an illumination pattern 60 on target substrate 50 and an aiming pattern light source bank 618 for use in projecting pattern 70 on substrate 50. Each of bank 606 and bank 618 can include one or more light sources. Terminal 1000 can include shaping optics 607, 619 for shaping light from light source banks 606 and 618, respectively, so that light from banks 606 and 618 can be projected into the aforementioned pattern 60 and pattern 70 respectively. In use, terminal 1000 can be oriented by an operator with respect to a substrate 50 bearing decodable indicia 115 in such manner that aiming pattern 70 is projected on a decodable indicia 115, that can be disposed on a target substrate 50. In the example of FIG. 2, decodable indicia 115 is provided by a 1D bar code symbol. Decodable indicia could also be provided by 2D bar code symbols or optical character recognition (OCR) characters. Each of illumination pattern light source bank 606 and aiming pattern light source bank 618 can include one or more light sources. Illumination assembly control circuit 1220 can send signals to illumination pattern light source bank 606 e.g., for changing a level of illumination output by illumination pattern light source bank 606. The combination of light source bank 606 and shaping optics 607 for shaping light from bank 606 for projecting pattern 60 can be regarded as an illumination pattern generator. The combination of illumination light source bank 618 and shaping optics 619 for shaping light from bank 618 for projecting pattern 70 can be regarded as an aiming pattern generator. In addition to or as an alternative to having an aiming pattern generator provided by the combination of light source bank 618 and shaping optics 619, terminal 1000 can have an aiming pattern generator provided by the combination of light source bank 620 and shaping optics 621.

Terminal 1000 can also include a number of peripheral devices such as display 1304 for displaying such information as image frames captured with use of terminal 1000, keyboard 1404, pointing device 1406 for control of a user interface cursor displayed on display 1304, and trigger 1408 which may be used to make active a trigger signal for activating frame readout and/or certain decoding processes. Terminal 1000 can be adapted so that activation of trigger 1408 activates a trigger signal and initiates a decode attempt. Terminal 1000 can be operative so that subsequent to activation of a trigger signal for a time that the trigger signal remains active, terminal 1000 captures into a memory e.g., memory 1080 a succession of frames of image data and subjects one or more of the captured frames to a decode attempt. Terminal 1000 can be adapted so that memory 1080 stores one or more frames of image data therein at a time. Memory 1080 can be capable of storing a frame of a succession of frames therein. When a frame of a succession of frames is stored in memory 1080, the frame can be addressed by CPU 1060 for subjecting the frame to decoding processing for attempting to decode the frame for decodable indicia.

Terminal 1000 can include various interface circuits for coupling various of the peripheral devices to system address/data bus (system bus) 1500, for communication with CPU 1060 also coupled to system bus 1500. Terminal 1000 can include interface circuit 1028 for coupling image sensor timing and control circuit 1038 to system bus 1500, interface circuit 1218 for coupling illumination assembly control circuit 1220 to system bus 1500, interface circuit 1302 for coupling display 1304 to system bus 1500, and interface circuit 1402 for coupling keyboard 1404, pointing device 1406, and trigger 1408 to system bus 1500.

In a further aspect, terminal 1000 can include one or more I/O interfaces 1604, 1606 for providing communication with external devices (e.g., a cash register server, a store server, an inventory facility server, a peer terminal 1000, a local area network base station, a cellular base station). I/O interfaces 1604, 1606 can be interfaces of any combination of known computer interfaces, e.g., Ethernet (IEEE 802.3), USB, IEEE 802.11, Bluetooth, CDMA, GSM.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame.

CPU 1060, appropriately programmed can carry out a decoding process for attempting to decode a frame of image data. Terminal 1000 can be operative so that CPU 1060 for attempting to decode a frame of image data can address image data of a frame stored in RAM 1080 and can process such image data. For attempting to decode, CPU 1060 can sample image data of a captured frame of image data along a sampling path, e.g., along a first sampling path through a first set of pixel positions corresponding to a first set of pixels 41 and along a second sampling path through a second set of pixel positions corresponding to a second set of pixels 42. Next, CPU 1060 can perform a second derivative edge detection to detect edges. After completing edge detection, CPU 1060 can determine data indicating widths between edges. CPU 1060 can then search for start/stop character element sequences and if found, derive element sequence characters, character by character by comparing with a character set table. For certain symbologies, CPU 1060 can also perform a checksum computation. If CPU 1060 successfully determines all characters between a start/stop character sequence and successfully calculates a checksum (if applicable), CPU 1060 can output a decoded message. Where a decodable indicia representation is a 2D bar code symbology, a decode attempt can comprise the steps of locating a finder pattern using a feature detection algorithm, locating scan lines intersecting the finder pattern according to a predetermined relationship with the finder pattern, determining a pattern of dark and light cells along the scan lines, and converting each light pattern into a character or character string via table lookup.

It has been noted that terminal 1000 can be operative so that subsequent to activation of a trigger signal, terminal 1000 can capture a succession of frames and subject one or more of the captured frames to a decode attempt. A succession of frames of image data that can be captured and subject to the described decoding processing can be full frames (including pixel values corresponding to more than about 80% of pixels of image sensor 1032). A succession of frames of image data that can be captured and subject to the described processing (e.g., processing for attempting to decode) can also be "windowed frames" comprising pixel values corresponding to less than about 80%, and in some cases less than about 50%, and in some cases less than 10% of pixels of image sensor 1032. A succession of frames of image data that can be captured and subject to the described processing can also comprise a combination of full frames and windowed frames. A full frame can be captured by selectively addressing for readout pixels of image sensor 1032 corresponding to the full frame. A windowed frame can be captured by selectively addressing for readout pixels of image sensor 1032 corresponding to the windowed frame.

Referring again to the diagram of FIG. 1, further aspects and advantages of the exemplary embodiment of FIG. 1 are further described. As shown in FIG. 1 first optical assembly 10 can have optical characteristics differentiated from second optical assembly 20. First optical assembly 10 can include a multiple element imaging lens 12 (shown as being provided by a triplet lens) which transmits imaging light rays about center optical axis 15 in such manner that in the embodiment shown center optical axis 15 is essentially unfolded along its length and passes essentially normally through image sensor array 1033 provided on image sensor integrated circuit chip 1040 and extending across an imaging plane 1041. First optical assembly 10 in the embodiment shown is essentially unfolded.

Second optical assembly 20 on the other hand is folded in the example illustrated. In the particular example shown second optical assembly 20 includes a multiple element imaging lens 22 (a triplet lens in the embodiment shown) and a double folding prism 32, which folds a center axis 25 of second optical assembly 20. In the particular embodiment shown, surface 34 of prism 32 produces a first fold in center axis 25 of about 86.8 degrees and surface 36 of prism 32 produces a second fold in center axis 25 of about 86.8 degrees and causes center axis 25 be directed to image sensor array 1033. In one embodiment, center optical axis 25 can be directed at image sensor array 1033 at an angle of about zero degrees relative to normal. In another embodiment, center optical axis 25 can be directed at image sensor array 1033 at an angle of about ten degrees relative to normal. In another embodiment, center optical axis 25 can be directed at image sensor array 1033 at an angle of about twelve degrees from normal. In another embodiment, center optical axis 25 can be directed at image sensor array 1033 at a certain angle of between zero degrees and fifteen degrees from normal. In one embodiment, first optical assembly 10 and second optical assembly 20 can be adapted so that the respective best focus distances and focal lengths of imaging lens 12 and imaging lens 22 are fixed.

A perspective exploded view of imaging module 600 in one embodiment is shown in FIG. 4. Referring to the view of FIG. 4, image sensor integrated circuit 1040 can be disposed on printed circuit board 602. Support 604 for mounting on printed circuit board 602 can support various components such as LEDs 606 which form an illumination light source bank in the embodiment of FIG. 4, double folding prism 32, imaging lens 12 disposed in barrel 14, imaging lens 22 disposed in barrel 24, aiming pattern light source bank 618, and optics 619 for shaping light from light source bank for projection of an aiming pattern 70. In the embodiment of FIG. 4, aiming pattern light source bank 618 is provided by a plurality of LEDs as shown in FIG. 4. An illumination pattern shaping optics (not shown in FIG. 4) for shaping light from light source bank 606 into pattern 60, can be mounted to an internal sidewall of a housing 11 of terminal 1000. As an addition to having or as an alternative to having the aiming pattern generator provided by bank 618 and optics 619, terminal 1000 can have an aiming pattern generator in accordance with that shown in FIG. 4 provided by light source bank 620 in combination with shaping optics 621 for projection of an aiming pattern 70. Light source bank 620 in the particular embodiment of FIG. 4 is provided by a laser diode assembly. Regarding the laser diode assembly of the embodiment of FIG. 4, the laser diode assembly forming an aiming light source bank 620 can be disposed on printed circuit board 602. FIG. 5 shows an assembled view of the module of FIG. 4. A perspective view of a hand held housing 11 supporting various components as shown in the block diagram of FIG. 5 and which can encapsulate the imaging module of FIGS. 4-5, including image sensor array 1033, is shown in FIG. 6.

A number of advantages are exhibited by the design in the aspects thusfar described. By being devoid of folding optics first optical assembly 10 is of minimal complexity and can be manufactured at reduced cost using a reduced number of components. Because of its reduced number of optical surfaces optical assembly 10 relative to an alternative assembly having folding optics produces a reduced level of optical distortion and increased light energy throughput. By its arrangement so that center optical axis 15 of first optical assembly 10 extends essentially normally from image plane 1041, optical assembly 10 focuses images onto image sensor array 1033 that are essentially devoid of keystone distortion.

Keystone distortion is produced when a center axis of a focusing optical assembly extends at an angle with respect to an image plane. An image representation of a square exhibiting keystone distortion takes on the shape of a keystone having top and bottom edges of unequal width and connecting first and second side edges that are in non-parallel relation to one another, and which extend at non-normal angles from the top and bottom edges. Decoding decodable indicia representations that exhibit significant keystone distortion can be challenging, especially for certain types of indicia. Relative to decoding bar code symbols having no keystone distortion, keystone distorted bar code symbol representations generally require longer decoding times and increased decoding algorithm complexity. Providing an optical system that increases the incidence of frames captured having little or no keystone distortion increases decoding efficiency.

Referring to second optical assembly 20, second optical assembly 20 is also advantageously configured. While double folding prism 32 of second optical assembly 20 can produce distortion not encountered if prism 32 is deleted, the introduction of folding optics into optical assembly 20 provides various advantages. One advantage provided by the introduction of folding optics into second optical assembly 20 is that utilization of a relatively smaller image sensor chip 1040 with relatively large scale optical components is facilitated. One of the largest cost factors of an indicia reading terminal 1000 is the cost of image sensor integrated circuit (chip) 1040 on which image sensor array 1033 is disposed. In general, costs of image sensor chip 1040 are kept small if of a mass produced sized. Generally mass produced relatively low cost image sensor chips are of relatively small dimensions (the image sensor array of an exemplary image sensor chip has an imaging area of 4.86 mm×3.71 mm). Further referring to advantages of optical assembly 20, the design of prism 32 in the particularly highlighted embodiment provides various advantages. While double folding prism 32 produces a fold at a center axis 25 of second optical assembly 20, it is seen that double folding prism 32 nevertheless directs center axis 25 of second imaging assembly 20 toward imaging plane 1041 at a near normal angle. Accordingly, image representations that are stored by terminal 1000 corresponding to second set of pixels 42 will be relatively free of keystone distortion and therefore relatively easy to decode as compared to frames exhibiting significant keystone distortion.

Figure 7:
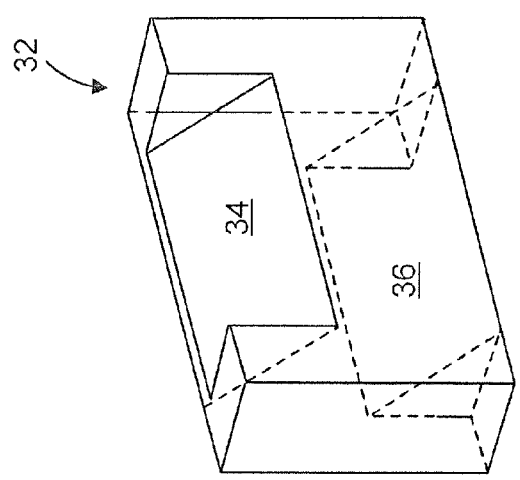
FIG. 7 is a perspective view of a double folding prism with hidden lines shown that can be precision manufactured in one embodiment.

In an alternative embodiment, double folding prism 32 as shown in FIG. 1 can be replaced with a set of first and second mirrors disposed respectively at the locations of first and second surfaces 34 and 36. However, relative to a mirror design, the inventors determined that a double folding prism design in accordance with prism 32 provides certain advantages. Prism 32 shown in perspective view of FIG. 7 can be formed by a process of injection molding using a mold form or else by a process of optical grinding. By either method, the angle between surface 34 and surface 36 can be precisely controlled. In one embodiment, an angle between surfaces 34 and 36 can be controlled so that surfaces 34 and 36 are parallel to one another. In another embodiment, the surfaces 34 and 36 can be controlled so that surfaces 34 and 36 are in a predetermined but non-parallel (e.g., a near parallel) relationship to one another. More particularly, with reference to FIG. 7, the angle between surface 34 and surface 36 can be precisely controlled by way of precision injection molding or optical grinding process. The providing of double folding prism 32 which can be manufactured by a precision manufacturing process including e.g., injection molding or grinding, reduces manufacturing costs and process steps e.g., a step including precision molding and alignment of a mirror system. Also, double folding prism 32 can be readily manufactured to be highly durable. By contrast, an alternative mirror design can readily become misaligned or damaged when terminal 1000 is dropped or otherwise subject to contact with a rigid surface. In one embodiment, double folding prism 32 can comprise a unitary piece of polycarbonate material.

The design thusfar described having a first optical assembly that is essentially unfolded and including a center axis that is essentially free of folds and a second optical assembly that is folded exhibits the package size reduction advantages yielded by a folding system, yet provides an optical path that yields performance advantages of an unfolded system.

Referring to further aspects of terminal 1000, first optical assembly 10 can have a first best focus distance and second optical assembly 20 have a second best focus distance that is different from the first best focus distance. Configuring assemblies 10 and 20 to have different best focus distances increases a working range of terminal 1000. For example, in one embodiment optical assembly 10 can be configured to have a short range best focus distance of 130 mm and second optical assembly 20 can be configured to have a long range best focus distance of 420 mm. Thus, a target substrate having decodable indicia that is too far away to be adequately focused by first optical assembly 10 may nevertheless be successfully focused by second optical assembly 20.

In another advantageous aspect, terminal 1000 can be configured so that first optical assembly 10 and second optical assembly 20 can have different focal lengths. Configuring first optical assembly 10 and second optical assembly 20 to have different focal lengths provides significant advantages. In one particularly advantageous example, imaging lens 22 of second optical assembly 20 can be configured to have a relatively longer focal length than near focused imaging lens 12 of first optical assembly 10. A field of view, O, of an optical system along a horizontal or vertical axis can be expressed by:

$$O = \frac{I(p-f)}{f} \quad \text{Equation 1}$$

Where I is the width of the image sensor array 1032 along the horizontal axis (or height along a vertical axis), p is the object (e.g., target substrate 50) to imaging lens distance, and f is the focal length of the imaging lens. Accordingly, it can be seen that for two optical assemblies at a given distance from a target, an optical assembly having a longer focal length will provide a narrower field of view. In one example, terminal 1000 can be configured so that second optical assembly 20 has a relatively larger focal length than first optical assembly 10.

Such a configuration is advantageous for a number of reasons. At longer reading distances a narrow field of view prevents there from being represented in a frame captured for decoding processing extraneous decodable indicia (e.g., on a shipping box other than the one of interest) that the user has no interest in decoding, and if subject to processing can unnecessarily consume processing time. Also, the narrow field of view at a long range focus distance provides for capture of high resolution (in terms of pixels per bar) frames for processing. In one example, two pixel samples (in the form of gray scale pixel values) are obtained per narrow bar or space element.

It has been noted that advantages are provided by a design having a first optical assembly that is essentially or minimally unfolded and a second folded optical assembly, and by designing one of the optical assemblies to have a longer focal length than the other. The inventors further determined that further advantages can be provided by selection of the longer focal length optical assembly (second assembly 20 in the example illustrated) as the assembly to include a folded center axis and the corresponding selection of the shorter focal length optical assembly (first assembly 10 in the example illustrated) as the assembly for inclusion of an essentially unfolded or minimally folded center optical axis. Namely, such selection provides significant packaging and miniaturization advantages. For optimal focusing of an image onto an image plane, the image plane must be spaced from an imaging lens at a lens to image plane distance of at least the focal length. As the long focal length imaging lens (imaging lens 22 in the example illustrated) requires relatively longer spacing from an image plane for achievement of optimal focusing the inclusion of folding optical prism 32 in second optical assembly 20 provides the appropriate spacing between lens 22 and plane 1041 yet without increasing the space requirements of module 600 along the Z axis. (Reference plane indicated in FIG. 1.)

Referring now further to advantages of the selected folded optical path for optical assembly 20, the folded design of second optical assembly 20 can also prevent a light blocking problem which might otherwise be encountered. The inventors determined, as has been described herein, that advantages may be yielded by selection of a relatively longer focal length for second optical assembly 20. The inventors also determined that if imaging lens 22 of second optical assembly 20 is spaced at a long distance from array 1033 relative to lens 12 in an alternative scheme where optical axis 15 and axis 25 are unfolded and in continuous parallel relation, imaging lens 12 can block light rays transmitted by lens 22 from reaching array 1033. Accordingly, another advantage of the selection of a folding optical system for second assembly 20 is that such selection prevents the described light blocking effect. Optical system data of the imaging module of FIG. 1 in one particular embodiment is summarized in Table 2 (first optical assembly 10) and in Table 3 (second optical assembly 20) below.

TABLE 2

| | |
|---|---|
| Lens Structure | air spaced triplet |
| Effective Focal Length | 5.88 mm |
| Paraxial F/# | 6.9 |
| Image size | 4.8604 mm × 2.784 mm |
| Plane of nominal focus | 130 mm |
| System FOV (full width) at nominal focus | 96 mm × 55 mm |

TABLE 3

| | |
|---|---|
| Lens Structure | air spaced triplet |
| Effective Focal Length | 11.8 mm |
| Paraxial F/# | 6.7 |
| Image size | 4.8604 mm × 0.928 mm |
| Plane of nominal focus | 420 mm |
| System FOV (full width) at nominal focus | 169 mm × 32 mm |

In arriving at a particularized version of the design shown in FIG. 1, the inventors recognized that while 1D bar code symbols are commonly encountered at long reading range distances, 2D bar code symbols are more commonly encountered at short range. For example, while shipping packages often located at longer terminal distances on shelves typically include a clustering of 1D bar code symbols, 2D bar code symbols are more commonly found on close range accessible objects such as identification cards and documents.

In another aspect of terminal 1000, terminal 1000 can be configured so that terminal 1000 is optimized for decoding 2D bar code symbols utilizing image data corresponding to a first set of pixels representing light transmitted through first optical assembly 10 and incident on first set of pixels and/or and be further configured so that terminal 1000 can be optimized for decoding 1D symbols utilizing image data corresponding to second set of pixels and representing light transmitted through second optical assembly 20 and incident on second set of pixels. 1D bar code symbols include UPC, Code 39 and Code 128. 2D bar code symbols include Datamatrix, QR Code, Aztec, and PDF 417. Terminal 1000 can be adapted so that a level of optimization for decoding 2D bar code symbols is higher when terminal 1000 processes image data representing light incident on first set of pixels 41 that has been transmitted by assembly 10 relative to when terminal 1000 processes image data representing light incident on second set of pixels 42 transmitted by second optical assembly 20.

In one embodiment of such an optimization scheme, terminal 1000 can be configured so that terminal 1000 can utilize each of N 2D bar code symbol decoding algorithms when processing image data representing light incident on first set of pixels 41, and further so that terminal 1000 is restricted from utilizing a subset of decoding algorithms of the set of N 2D decoding algorithms when processing image data corresponding to pixels of the second set 42 for decoding. In another embodiment of an optimization scheme, terminal 1000 can be restricted from applying any 2D bar code symbol decoding algorithm when processing frame image data corresponding to pixels of the second set 42 for decoding.

In another aspect of a 1D/2D optimization scheme described, terminal 1000 can be configured so that images projected by the first optical assembly 10 are focused on a larger percentage of pixels of images sensor array 1033 than are images projected by optical assembly 20. In one embodiment, first optical assembly 10 can be adapted to focus a target substrate image on more than 50% of pixels of image sensor array 1033, and second optical assembly 20 can be adapted to focus a target substrate image on less than 50% of pixels of image sensor array 1033. In a particular embodiment, first optical assembly 10 can be adapted to focus a target substrate image on about 60% of pixels of array 1033 and second optical assembly 20 is configured to focus a target image on about the remaining 40% of the pixels of array 1033. In another embodiment, first optical assembly 10 can be adapted to focus a target substrate image on 75% of pixels of array 1033 and second optical assembly 20 can be adapted to focus a target substrate image on the remaining 25% of pixels of array 1033. The described pixel sharing ratio aspect of a 1D/2D optimization scheme recognizes that 1D bar code symbols can often be readily decoded by processing of image data corresponding to limited number of rows (or columns), and possibly a single row (or column) of pixels of an image sensor array 1033.

Figure 8:
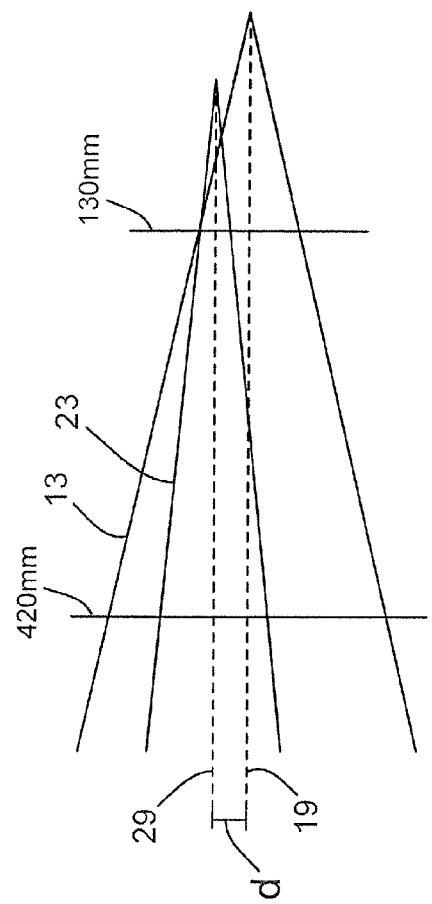
FIG. 8 is a side view illustrating relationships between fields of view associated with first and second optical assemblies in one embodiment.
Figure 9:
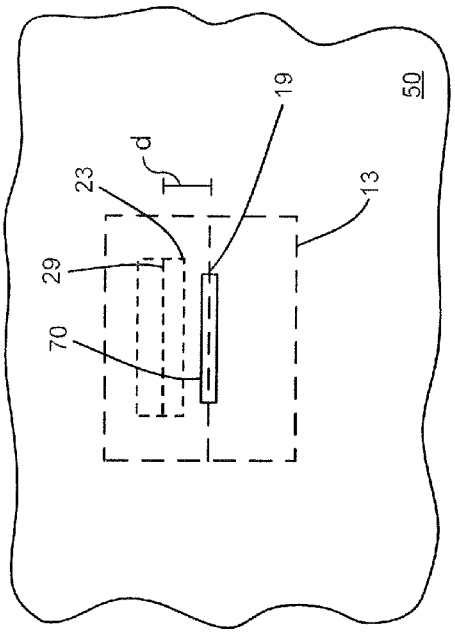
FIG. 9 is an illustration of a set of fields of view defined on a target substrate by first and second optical assemblies and an image sensor array at a first, shorter terminal to target distance where the terminal is adapted so that an aiming pattern is projected substantially at a horizontally extending centerline of the first field of view.
Figure 10:
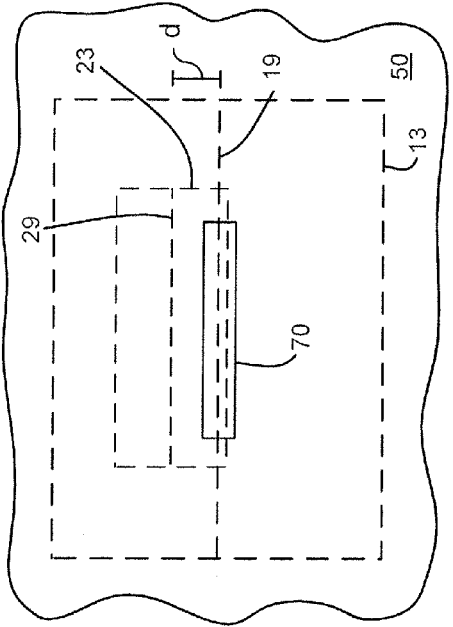
FIG. 10 is an illustration of a set of fields of view defined on a target substrate by first and second optical assemblies in combination with an image sensor array at a second, longer terminal to target distance where the terminal is adapted so that an aiming pattern is projected substantially at a horizontally extending centerline of a first field of view.
Figure 11:
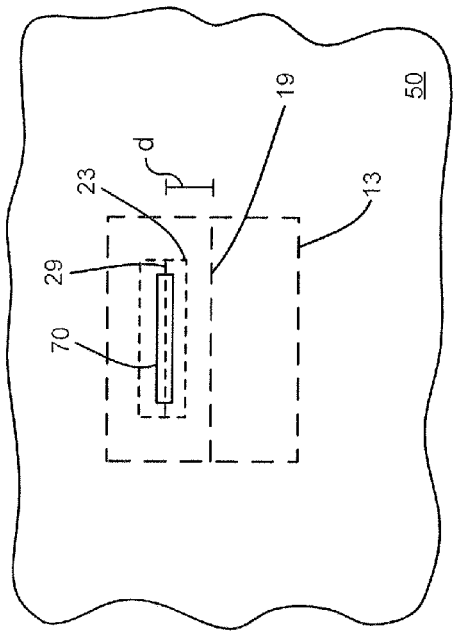
FIG. 11 is an illustration of a set of fields of view defined on a target substrate by first and second optical assemblies in combination with an image sensor array at a first, shorter terminal to target distance where the terminal is adapted so that an aiming pattern is projected substantially at a horizontally extending centerline of a second field of view.
Figure 12:
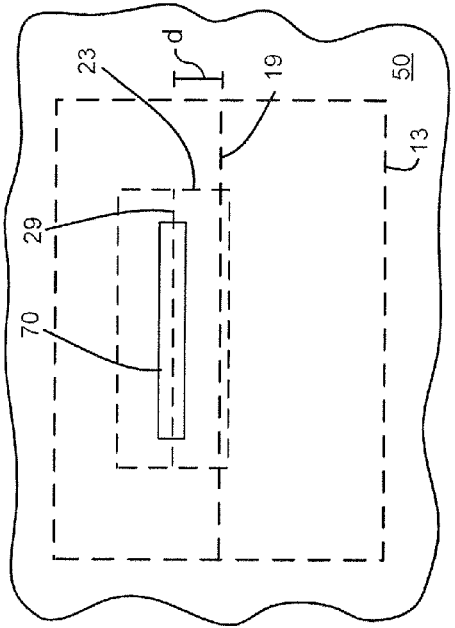
FIG. 12 is an illustration of a set of fields of view defined on a target substrate by first and second optical assemblies in combination with an image sensor array at a second, longer terminal to target distance where the terminal is adapted so that an aiming pattern is projected substantially at a horizontally extending centerline of a second field of view.

Referring to further aspects of imaging module 600, imaging module 600 can be adapted so that light from aiming pattern light source bank 618 is projected at a specific location with respect to a target substrate 50 on which fields of view 13 and 23 can be defined. FIG. 8 illustrates respective fields of view 13 and 23 defined by first optical assembly 10 and second optical assembly 20, respectively, at various terminal to target distances ranging from a short range distance of about 130 mm to a long range distance of about 420 mm. FIG. 8 illustrates the relative fields of view 13 and 23 at a relatively shorter terminal to target distance e.g., 130 mm through a relatively longer terminal to target distance e.g., 420 mm. Terminal 1000 can be adapted so that field of view 23 is defined within field of view 13 through a range of terminal to target distances as is illustrated in FIG. 8. As seen from FIG. 8 corresponding to an optical system in accordance with that generally described with reference to FIG. 1, the field of view 13 defined by first optical assembly 10 in combination with image sensor array 1033, at a given terminal to target distance, is relatively larger than field of view 23 defined by second optical assembly 20 in combination with image sensor array 1033. Also, as is illustrated by FIG. 8, field of view 23 can be defined at a location within a field of view 13 through a range of terminal to target distances ranging from a short range distance of about 130 mm to a long range distance of about 420 mm. Further, while field of view 23 moves closer to the upper border of field of view 13 at shorter terminal to target distances, and while the field of view moves closer to and can encompass horizontally extending centerline 19 at longer terminal to target distances, the actual distance, d, between the horizontally extending centerlines 19 and 29 of the respective fields of view 13, 23 remains a constant distance, d, all throughout the full range of terminal to target distances. In one embodiment, terminal 1000 can be adapted so that the aiming pattern generator provided by light source bank 618 in combination with optics 619 projects an aiming pattern 70 as is shown in FIGS. 9 and 10. In the embodiment described in connection with FIGS. 9 and 10, the aiming pattern generator provided by bank 618 and optics 619 projects an aiming pattern that is projected substantially at a horizontally extending centerline 19 of first field of view 13 through a range of terminal to target distances ranging from a short range distance of about 130 mm to a long range distance of about 420 mm. It has been noted that at longer terminal to target distances, field of view 23 can approach and can encompass horizontally extending centerline 19 of field of view 13. Accordingly, adapting terminal 1000 to project an aiming pattern 70 at horizontally extending centerline 19 provides good aiming and a range of terminal to target distances which range in one embodiment can include a shorter range distance of about 130 mm through a long range distance of about 420 mm. According to one embodiment as is described with reference to FIGS. 11 and 12, terminal 1000 can include an aiming pattern generator adapted so that aiming pattern 70 is projected substantially on horizontally extending centerline 29 of field of view 23 throughout the range of terminal to target distances (e.g., from a short, e.g., 130 mm to a long, e.g., 420 mm distance). Recognizing that aiming pattern 70 will, through a range of terminal to target distances be projected within field of view 13 where terminal 1000 is adapted so that field of view 23 is defined within field of view 13 through a range of terminal to target distances, and where terminal 1000 is adapted so that pattern 70 is projected at a substantially fixed position within field of view 23, the projecting of aiming pattern 70 at a horizontally extending centerline 29 of field of view 23 throughout a range of terminal to target distances (e.g., from a short range of 130 mm to a long range of about 420 mm) provides high quality aiming throughout the full range of terminal to target distances. The arrangement described can be particularly advantageous in the case as described with reference to FIG. 1 where second assembly 20 has a longer best focus distance and longer focal length that first optical assembly 10. An aiming pattern generator for generating aiming pattern 70 as shown in FIGS. 11 and 12 can be provided by, e.g., light source bank 620 provided by a laser diode assembly in combination with shaping optics 621 as is shown in the imaging module of FIG. 1.

In one embodiment, terminal 1000 can include a single aiming pattern generator that projects aiming pattern 70 at a horizontally extending centerline 19 of field of view 13 through a range of terminal to target distances as shown in FIGS. 9 and 10. In one embodiment, terminal 1000 can include a single aiming pattern generator that projects aiming pattern 70 as a horizontally extending centerline 29 of field of view 23 as shown in FIGS. 11 and 12.

Figure 13:
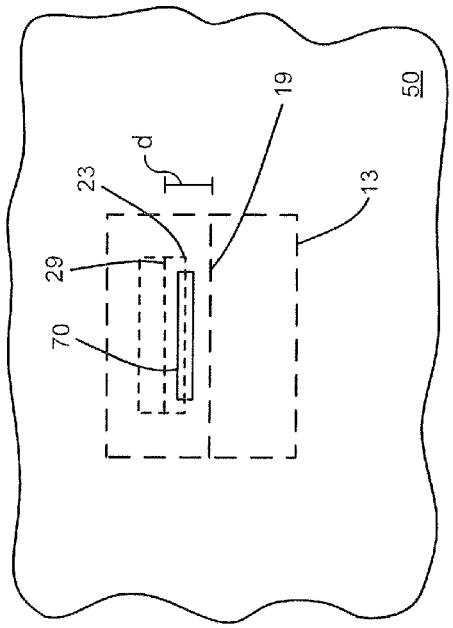
FIG. 13 is an illustration of a set of fields of view defined on a target substrate by first and second optical assemblies in combination with an image sensor array at a first, shorter terminal to target distance where the terminal is adapted so that an aiming pattern is projected substantially at horizontally extending centerline of each of said first and second fields of view.
Figure 14:
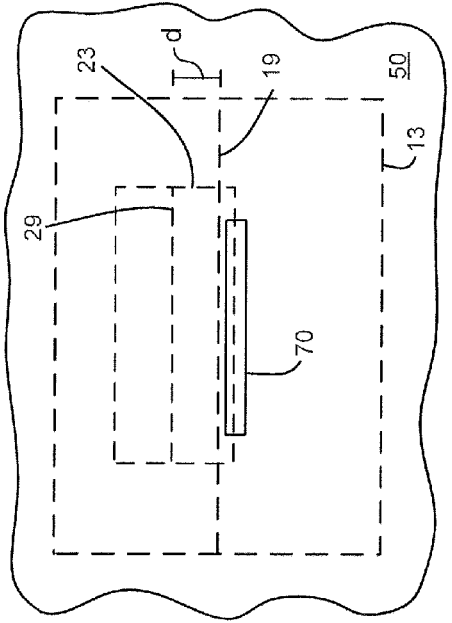
FIG. 14 is an illustration of a set of fields of view defined on a target substrate by first and second optical assemblies in combination with an image sensor array at a second, longer terminal to target distance where the terminal is adapted so that an aiming pattern is projected substantially at horizontally extending centerline of each of said first and second fields of view.
Figure 15:
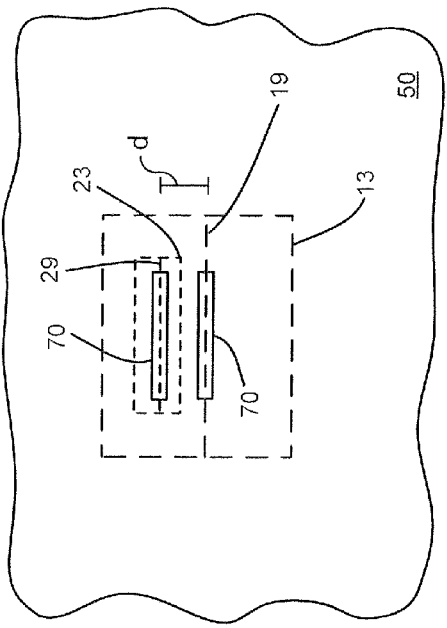
FIG. 15 is an illustration of a set of fields of view defined on a target substrate by first and second optical assemblies in combination with an image sensor array at a first, shorter terminal to target distance where the terminal is adapted so that an aiming pattern is projected intermediate of horizontally extending centerline of the first and second fields of view.
Figure 16:
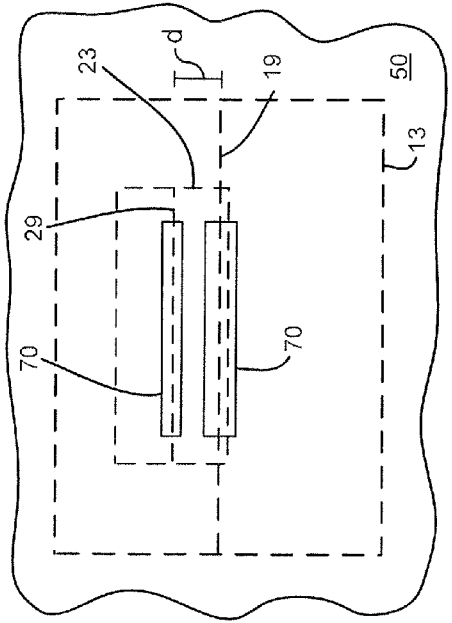
FIG. 16 is an illustration of a set of fields of view defined on a target substrate by first and second optical assemblies in combination with an image sensor array at a second, longer terminal to target distance where the terminal is adapted so that an aiming pattern is projected intermediate of horizontally extending centerlines of first and second fields of view.

In yet another embodiment, terminal 1000 can include first and second aiming pattern generators for projecting each of an aiming pattern 70 substantially at horizontally extending centerline 19 through a range of terminal to target distances and aiming pattern 70 substantially at horizontally extending centerline 29 through a range of terminal to target distances. Terminal 1000 in one embodiment can include a first aiming pattern generator comprising elements 618 and 619 and a second aiming pattern generator comprising elements 620 and 621. Terminal 1000 can be operative so that the two spaced apart patterns can be projected simultaneously as shown in FIGS. 13 and 14. Alternatively, terminal 1000 can be operative so that the two patterns are projected in the alternative in a manner responsive to a sensed condition. For example, terminal 1000 can be operative to selectively activate a first aiming pattern 70 substantially at horizontally extending centerline 19 at shorter terminal to target distances (with the second aiming pattern generator being deactivated at such terminal to target distances) and can be operative to selectively activate a second aiming pattern generator to project aiming pattern 70 at horizontally extending centerline 29 at longer terminal to target distances (with the first aiming pattern generator being off at such terminal to target distances). Terminal 1000 can be operative to sense a terminal to target distance by reading a white level of a frame of image data, with a higher coverage white level indicating more artificial illumination from terminal 1000 and therefore a closer terminal to target distance. In another embodiment as is illustrated in FIGS. 15 and 16, an aiming pattern generator, e.g., 618, 619 or generator 620, 621 can be adapted to project aiming pattern 70 at a position intermediate of horizontally extending centerline 19 and horizontally extending centerline 29 through a range of terminal to target distances ranging from a short range, e.g., 130 mm to a long range, e.g., 420 mm.

A small sample of systems methods and apparatus that are described herein is as follows:

A1. An indicia reading terminal comprising:
a two dimensional image sensor array extending along an image plane, said two dimensional image sensor array comprising a plurality of pixels;
a hand held housing encapsulating said two dimensional image sensor array;
a first optical assembly having a center optical axis and an imaging lens, said first optical assembly for focusing imaging light rays onto a first set of pixels of said two dimensional image sensor array, wherein said imaging light rays transmitted by said first optical assembly are transmitted about said center optical axis of said first optical assembly, and wherein said first optical assembly is adapted so that said center optical axis of said first optical assembly is essentially unfolded;
a second optical assembly having a center optical axis and an imaging lens, said second optical assembly for focusing imaging light rays onto a second set of pixels of said two dimensional image sensor array, wherein said imaging light rays transmitted by said second optical assembly are transmitted about said center optical axis of said second optical assembly, and wherein said second optical assembly includes an optical surface that folds said center optical axis of said second optical assembly by an angle of more than 10 degrees;
a memory capable of storing a frame of image data, said frame of image data representing light incident on said image sensor array; and
a CPU capable of addressing said memory, wherein said CPU is adapted to attempt to decode a decodable indicia represented in said frame of image data.

A2. The indicia reading terminal of claim A1, wherein said imaging lens of said first optical assembly has a shorter focal length than said imaging lens of said second optical assembly.

A3. The indicia reading terminal of claim A1, wherein said indicia reading terminal is adapted so that a field of view defined by said first optical assembly in combination with said image sensor array when said indicia reading terminal is at a certain terminal to target distance is larger than a field of view defined by said second optical assembly in combination with said image sensor array when said indicia reading terminal is at said certain terminal to target distance.

A4. The indicia reading terminal of claim A1, wherein said first optical assembly has a shorter best focus distance than said second optical assembly.

A5. The indicia reading terminal of claim A1, wherein said first optical assembly has a shorter best focus distance than said second optical assembly, wherein said first optical assembly has a shorter focal length than said second optical assembly, and wherein said first and second optical assemblies are fixed assemblies such that that said best focus distances and said focal lengths of said first and second optical assemblies are fixed.

A6. The indicia reading terminal of claim A1, wherein said first set of pixels comprises a larger number of pixels than a number of pixels of said second set of pixels.

A7. The indicia reading terminal of claim A1, wherein a ratio of pixels of said first set of pixels to said second set of pixels is greater than 1.5.

A8. The indicia reading terminal of claim A1, wherein said second optical assembly includes a double folding prism disposed in an optical path of said second optical assembly intermediate of said imaging lens of said second optical assembly and said image sensor array, the double folding prism folding said center optical axis of said second optical assembly in at least two locations, said double folding prism being adapted so that said center optical axis of said second optical assembly extends from said image sensor array at an angle that deviates from a normal angle by less than 10 degrees.

A9. The indicia reading terminal of claim A1, wherein said second optical assembly includes a double folding prism disposed in an optical path of said second optical assembly intermediate of said imaging lens of said second optical assembly and said image sensor array, the double folding prism having at least two reflective surfaces for bending said center optical axis of said second optical assembly, said double folding prism being formed utilizing one of a precision molding process and a precision grinding process.

A10. The indicia reading terminal of claim A1, wherein said indicia reading terminal is capable of processing image data of said certain frame for attempting to decode a 2D bar code symbol representation, and wherein said indicia reading terminal is operative so that a level of optimization for decoding of a 2D bar code symbol representations is greater when said CPU processes image data representing light incident on said first set of pixels than when processing image data representing light incident on said second set of pixels.

A11. The indicia reading terminal of claim A10, wherein said indicia reading terminal is restricted from operating according to an algorithm for attempting to decode a 2D bar code symbol when processing image data corresponding to said second set of pixels.

A12. The indicia reading terminal of claim A1, wherein said first optical assembly defines with said image sensor array a first field of view, wherein said second optical assembly defines with said image sensor array a second field of view, and wherein said indicia reading terminal is adapted so that said indicia reading terminal projects an aiming pattern at a substantially fixed location in relation to said second field of view though a range of terminal to target distances ranging from a short range terminal to target distance of about 130 mm to a long range terminal to target distance of about 420 mm.

A13. The indicia reading terminal of claim A1, wherein said first optical assembly defines with said image sensor array a first field of view and wherein said second optical assembly defines with said image sensor array a second field of view, and wherein said indicia reading terminal is adapted so that said indicia reading terminal projects an aiming pattern substantially at a horizontally extending centerline of said second field of view though a range of terminal to target distances ranging from a short range terminal to target distance of about 130 mm to a long range terminal to target distance of about 420 mm.

A14. The indicia reading terminal of claim A1, wherein said indicia reading terminal is adapted so that said first set of pixels includes a set of pixels extending across more than 50% of the rows of said image sensor array and wherein said second set of pixels includes a set of pixels extending across less than 50% of rows of pixels of said pixels of image sensor array.

A15. The indicia reading terminal of claim A1, wherein said second optical assembly includes an optical surface that folds said center optical axis of said second optical assembly by more than 30 degrees.

A16. The indicia reading terminal of claim A1, wherein said indicia reading terminal includes aiming pattern generator that projects an aiming pattern substantially at a horizontally extending centerline of a field of view defined by said first optical assembly in combination with said image sensor array through a range of terminal to target distances ranging from about 130 mm to 420 mm.

A17. The indicia reading terminal of claim A1, wherein said indicia reading terminal wherein said first optical assembly and said image sensor array define a first field of view, and wherein said second optical assembly and said image sensor array define a second field of view, and wherein said terminal includes a first a first aiming pattern generator and a second aiming pattern generator, the first aiming pattern generator capable of projecting an aiming pattern substantially at a horizontally extending centerline of said first field of view through a range of terminal to target distances, the second aiming pattern generator capable of projecting an aiming pattern substantially at a horizontally extending centerline of said second field of view through a range of terminal to target distances.

A18. The indicia reading terminal of claim A17, wherein said terminal is operative so that at least one of said first and second aiming pattern generators is activated responsively to a sensed condition.

A19. The indicia reading terminal of claim A1, wherein said first optical assembly and said image sensor array define a first field of view and wherein said second optical assembly and said image sensor array define a second field of view, and wherein said terminal includes an aiming pattern generator that projects an aiming pattern substantially at a horizontally extending centerline of said second field of view through a range of terminal to target distances.

B1. An indicia reading terminal comprising:
a two dimensional image sensor array extending along an image plane, said two dimensional image sensor array comprising a plurality of pixels;
a hand held housing encapsulating said two dimensional image sensor array;
a first optical assembly defining in combination with said image sensor array a first field of view, said first optical assembly having a center optical axis and an imaging lens, the first optical assembly for focusing imaging light rays onto a first set of pixels of said two dimensional image sensor array, said first set of pixels comprising more than 50% of pixels of said image sensor array, wherein said imaging light rays transmitted by said first optical assembly are transmitted about said first center optical axis of said first optical assembly, and wherein said first optical assembly is adapted so that said first center optical axis is essentially unfolded;
a second optical assembly defining in combination with said image sensor array a second field of view, said second optical assembly having a center optical axis and an imaging lens, the second optical assembly for focusing imaging light rays onto a second set of pixels of said two dimensional image sensor array, said second set of pixels comprising less than 50% of pixels of said image sensor array, wherein said imaging light rays transmitted by said second optical assembly are transmitted about said center optical axis of said second optical assembly, and wherein said second optical assembly includes an optical element that folds said center optical axis of said second optical assembly by an angle of more than 10 degrees, said second optical assembly having a longer best focus distance than said first optical assembly, said imaging lens of said second optical assembly having a longer focal length than said imaging lens of said first optical assembly;
an aiming pattern generator including a laser diode assembly, said aiming pattern generator projecting an aiming pattern;
a memory capable of storing a frame of image data, said frame of image data having image data representing light incident on said image sensor array; and
a CPU capable of addressing said memory, wherein said CPU is adapted to attempt to decode a decodable indicia represented in said frame of image data.

B2. The indicia reading terminal of claim B1, wherein said aiming pattern generator is adapted to project said aiming pattern substantially at a horizontally extending centerline of said second field of view through a range of terminal to target distances.

C1. An indicia reading terminal comprising:
a two dimensional image sensor array extending along an image plane, said two dimensional image sensor array comprising a plurality of pixels;
a hand held housing encapsulating said two dimensional image sensor array;
a first optical assembly having a center optical axis and an imaging lens, said first optical assembly for focusing imaging light rays onto a first set of pixels of said two dimensional image sensor array, wherein said imaging light rays transmitted by said first optical assembly are transmitted about said center optical axis of said first optical assembly;
a second optical assembly having a center optical axis and an imaging lens, said second optical assembly for focusing imaging light rays onto a second set of pixels of said two dimensional image sensor array, wherein said imaging light rays transmitted by said second optical assembly are transmitted about said center optical axis of said second optical assembly, and wherein said second optical assembly includes a precision manufactured double folding prism for folding said center optical axis of said second optical assembly at two locations, said double folding prism being precision manufactured by one of an injection molding process or an optical grinding process;

a memory capable of storing a frame of image data, said frame of image data representing light incident on said image sensor array; and a CPU capable of addressing said memory, wherein said CPU is adapted to attempt to decode a decodable indicia represented in said frame of image data.

C2. The indicia reading terminal of claim C1, wherein said first optical assembly is adapted so that said center optical axis of said first optical assembly is essentially unfolded.

C3. The indicia reading terminal of claim C1, wherein said second optical assembly includes a longer best focus distance and a longer focal length than said first optical assembly, and wherein said indicia reading terminal is adapted so that a field of view defined by said second optical assembly and said image sensor array is defined, throughout a range of terminal to target distances from about 130 mm to about 420 mm, at a location within a field of view defined by said second optical assembly and said image sensor array throughout a range of terminal to target distances from about 130 mm to about 420 mm.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements.

The invention claimed is:

1. An indicia reading terminal comprising:
   a two dimensional image sensor array extending along an image plane, said two dimensional image sensor array comprising a plurality of pixels;
   a hand held housing encapsulating said two dimensional image sensor array;
   a first optical assembly having a center optical axis and an imaging lens, said first optical assembly for focusing imaging light rays onto a first set of pixels of said two dimensional image sensor array, wherein said imaging light rays transmitted by said first optical assembly are transmitted about said center optical axis of said first optical assembly, and wherein said first optical assembly is adapted so that said center optical axis of said first optical assembly is essentially unfolded;
   a second optical assembly having a center optical axis and an imaging lens, said second optical assembly for focusing imaging light rays onto a second set of pixels of said two dimensional image sensor array, wherein said imaging light rays transmitted by said second optical assembly are transmitted about said center optical axis of said second optical assembly, and wherein said second optical assembly includes an optical surface that folds said center optical axis of said second optical assembly by an angle of more than 10 degrees;
   a memory capable of storing a frame of image data, said frame of image data representing light incident on said image sensor array; and
   a CPU capable of addressing said memory, wherein said CPU is adapted to attempt to decode a decodable indicia represented in said frame of image data;
   wherein said first optical assembly and said image sensor array define a first field of view, and wherein said second optical assembly and said image sensor array define a second field of view, and wherein said second field of view is defined within said first field of view throughout a range of terminal to target distances of from about 130 mm to about 420 mm.

2. The indicia reading terminal of claim 1, wherein said indicia reading terminal is adapted so that a field of view defined by said first optical assembly in combination with said image sensor array when said indicia reading terminal is at a certain terminal to target distance is larger than a field of view defined by said second optical assembly in combination with said image sensor array when said indicia reading terminal is at said certain terminal to target distance.

3. The indicia reading terminal of claim 1, wherein said first optical assembly has a shorter best focus distance than said second optical assembly.

4. The indicia reading terminal of claim 1, wherein said first optical assembly has a shorter best focus distance than said second optical assembly, wherein said first optical assembly has a shorter focal length than said second optical assembly, and wherein said first and second optical assemblies are fixed assemblies such that said best focus distances and said focal lengths of said first and second optical assemblies are fixed.

5. The indicia reading terminal of claim 1, wherein said first set of pixels comprises a larger number of pixels than a number of pixels of said second set of pixels.

6. The indicia reading terminal of claim 1, wherein a ratio of pixels of said first set of pixels to said second set of pixels is greater than 1.5.

7. The indicia reading terminal of claim 1, wherein said second optical assembly includes a double folding prism disposed in an optical path of said second optical assembly intermediate of said imaging lens of said second optical assembly and said image sensor array, the double folding prism folding said center optical axis of said second optical assembly in at least two locations, said double folding prism being adapted so that said center optical axis of said second optical assembly extends from said image sensor array at an angle that deviates from a normal angle by less than 10 degrees.

8. The indicia reading terminal of claim 1, wherein said second optical assembly includes a double folding prism disposed in an optical path of said second optical assembly intermediate of said imaging lens of said second optical assembly and said image sensor array, the double folding prism having at least two reflective surfaces for bending said center optical axis of said second optical assembly, said double folding prism being formed utilizing one of a precision molding process and a precision grinding process.

9. The indicia reading terminal of claim 1, wherein said indicia reading terminal is restricted from operating according to an algorithm for attempting to decode a 2D bar code symbol when processing image data corresponding to said second set of pixels.

10. The indicia reading terminal of claim 1, wherein said first optical assembly defines with said image sensor array a first field of view, wherein said second optical assembly defines with said image sensor array a second field of view, and wherein said indicia reading terminal is adapted so that said indicia reading terminal projects an aiming pattern at a substantially fixed location in relation to said second field of view though a range of terminal to target distances ranging from a short range terminal to target distance of about 130 mm to a long range terminal to target distance of about 420 mm.

11. The indicia reading terminal of claim 1, wherein said second optical assembly includes an optical surface that folds said center optical axis of said second optical assembly by more than 30 degrees.

12. The indicia reading terminal of claim 1, wherein said indicia reading terminal includes aiming pattern generator that projects an aiming pattern substantially at a horizontally extending centerline of a field of view defined by said first optical assembly in combination with said image sensor array through a range of terminal to target distances ranging from about 130 mm to 420 mm.

13. The indicia reading terminal of claim 1, wherein said first optical assembly and said image sensor array define a first field of view and wherein said second optical assembly and said image sensor array define a second field of view, and wherein said terminal includes an aiming pattern generator that projects an aiming pattern substantially at a horizontally extending centerline of said second field of view through a range of terminal to target distances.

14. The indicia reading terminal of claim 1,
wherein said second optical assembly includes a longer best focus distance and a longer focal length than said first optical assembly.

15. The indicia reading terminal of claim 1, wherein the indicia reading terminal includes a single aiming pattern generator that projects an aiming pattern within the second field of view throughout the range of terminal to target distances of from about 130 mm to about 420 mm.

16. The indicia reading terminal of claim 1, wherein the indicia reading terminal includes a single aiming pattern generator that projects an aiming pattern within the first field of view throughout the range of terminal to target distances of from about 130 mm to about 420 mm.

17. An indicia reading terminal comprising:
a two dimensional image sensor array extending along an image plane, said two dimensional image sensor array comprising a plurality of pixels;
a hand held housing encapsulating said two dimensional image sensor array;
a first optical assembly having a center optical axis and an imaging lens, said first optical assembly for focusing imaging light rays onto a first set of pixels of said two dimensional image sensor array, wherein said imaging light rays transmitted by said first optical assembly are transmitted about said center optical axis of said first optical assembly, and wherein said first optical assembly is adapted so that said center optical axis of said first optical assembly is essentially unfolded;
a second optical assembly having a center optical axis and an imaging lens, said second optical assembly for focusing imaging light rays onto a second set of pixels of said two dimensional image sensor array, wherein said imaging light rays transmitted by said second optical assembly are transmitted about said center optical axis of said second optical assembly, and wherein said second optical assembly includes an optical surface that folds said center optical axis of said second optical assembly by an angle of more than 10 degrees;
a memory capable of storing a frame of image data, said frame of image data representing light incident on said image sensor array; and
a CPU capable of addressing said memory, wherein said CPU is adapted to attempt to decode a decodable indicia represented in said frame of image data;
wherein said indicia reading terminal is capable of processing image data of said certain frame for attempting to decode a 2D bar code symbol representation, and wherein said indicia reading terminal is operative so that a level of optimization for decoding of a 2D bar code symbol representations is greater when said CPU processes image data representing light incident on said first set of pixels than when processing image data representing light incident on said second set of pixels, wherein said first set of pixels and said second set of pixels each comprise pixels of greater than ten rows of pixels.

18. The indicia reading terminal of claim 17, wherein said first optical assembly defines with said image sensor array a first field of view and wherein said second optical assembly defines with said image sensor array a second field of view, and wherein said indicia reading terminal is adapted so that said indicia reading terminal projects an aiming pattern substantially at a horizontally extending centerline of said second field of view though a range of terminal to target distances ranging from a short range terminal to target distance of about 130 mm to a long range terminal to target distance of about 420 mm.

19. The indicia reading terminal of claim 17, wherein said indicia reading terminal is adapted so that said first set of pixels includes a set of pixels extending across more than 50% of the rows of said image sensor array and wherein said second set of pixels includes a set of pixels extending across less than 50% of rows of pixels of said pixels of image sensor array.

20. The indicia reading terminal of claim 17, wherein said indicia reading terminal wherein said first optical assembly and said image sensor array define a first field of view, and wherein said second optical assembly and said image sensor array define a second field of view, and wherein said terminal includes a first a first aiming pattern generator and a second aiming pattern generator, the first aiming pattern generator capable of projecting an aiming pattern substantially at a horizontally extending centerline of said first field of view through a range of terminal to target distances, the second aiming pattern generator capable of projecting an aiming pattern substantially at a horizontally extending centerline of said second field of view through a range of terminal to target distances.

21. The indicia reading terminal of claim 20, wherein the first aiming pattern generator and the second aiming pattern generator are activated in the alternative responsively to a sensed terminal to target distance.

22. The indicia reading terminal of claim 17, wherein said indicia reading terminal is restricted from operating according to an algorithm for attempting to decode a 2D bar code symbol when processing image data corresponding to said second set of pixels.

23. The indicia reading terminal of claim 17, wherein the first set of pixels and the second set of pixels each comprise more than ten rows of pixels.

24. The indicia reading terminal of claim 17, wherein the indicia reading terminal is operative to utilize a 2D bar code symbology decoding algorithm when processing image data corresponding to pixels of the first set of pixels for decoding, wherein the indicia reading terminal is also operative to utilize a 2D bar code symbology decoding algorithm when processing image data corresponding to pixels of the second set of pixels for decoding.

25. An indicia reading terminal comprising:
a two dimensional image sensor array extending along an image plane, said two dimensional image sensor array comprising a plurality of pixels;
a hand held housing encapsulating said two dimensional image sensor array;

a first optical assembly having a center optical axis and an imaging lens, said first optical assembly for focusing imaging light rays onto a first set of pixels of said two dimensional image sensor array, wherein said imaging light rays transmitted by said first optical assembly are transmitted about said center optical axis of said first optical assembly, and wherein said first optical assembly is adapted so that said center optical axis of said first optical assembly is essentially unfolded;

a second optical assembly having a center optical axis and an imaging lens, said second optical assembly for focusing imaging light rays onto a second set of pixels of said two dimensional image sensor array, wherein said imaging light rays transmitted by said second optical assembly are transmitted about said center optical axis of said second optical assembly, and wherein said second optical assembly includes an optical surface that folds said center optical axis of said second optical assembly by an angle of more than 10 degrees;

a memory capable of storing a frame of image data, said frame of image data representing light incident on said image sensor array; and a CPU capable of addressing said memory, wherein said CPU is adapted to attempt to decode a decodable indicia represented in said frame of image data;

wherein said second optical assembly includes a double folding prism of unitary construction disposed in an optical path of said second optical assembly intermediate of said imaging lens of said second optical assembly and said image sensor array, the double folding prism folding said center optical axis of said second optical assembly in at least two locations, said double folding prism being adapted so that said center optical axis of said second optical assembly extends from said image sensor array at an angle that deviates from a normal angle by less than 10 degrees.

26. The indicia reading terminal of claim 25, wherein the double folding prism having at least two reflective surfaces for bending said center optical axis of said second optical assembly, said double folding prism being formed utilizing one of a precision molding process and a precision grinding process.

27. The indicia reading terminal of claim 25, wherein said center optical axis of said second optical assembly extends from said image sensor array at a non-zero angle that deviates from a normal angle by less than 10 degrees.

28. The indicia reading terminal of claim 25, wherein said first optical assembly and said image sensor array define a first field of view, and wherein said second optical assembly and said image sensor array define a second field of view, and wherein said second field of view is defined within said first field of view throughout a range of terminal to target distances of from about 130 mm to about 420 mm.

* * * * *